(12) United States Patent
Isebrand (10) Patent No.: US 10,852,203 B2
(45) Date of Patent: Dec. 1, 2020

(54) TOTAL AIR TEMPERATURE PROBE WITH CONCAVE FLOW PATH TRANSITIONS TO OUTLET

(71) Applicant: Rosemount Aerospace Inc., Burnsville, MN (US)

(72) Inventor: Scott D. Isebrand, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 257 days.

(21) Appl. No.: 16/010,011

(22) Filed: Jun. 15, 2018

(65) Prior Publication Data

US 2019/0383673 A1    Dec. 19, 2019

(51) Int. Cl.
*G01K 13/00* (2006.01)
*G01K 1/00* (2006.01)
*G01K 7/00* (2006.01)
*G01K 13/02* (2006.01)

(52) U.S. Cl.
CPC .................. *G01K 13/028* (2013.01)

(58) Field of Classification Search
USPC ................. 374/208, 138, 163, 148
See application file for complete search history.

(56) References Cited

U.S. PATENT DOCUMENTS

| 2,970,475 A | 2/1961 | Werner |
| 5,302,026 A | 4/1994 | Phillips |
| 5,653,538 A | 8/1997 | Philips |
| 5,752,674 A | 5/1998 | Mears et al. |
| 6,609,825 B2 | 8/2003 | Ice et al. |
| 6,651,515 B2 | 11/2003 | Bernard |
| 6,817,240 B2 | 11/2004 | Collot et al. |
| 6,840,672 B2 | 1/2005 | Ice et al. |

(Continued)

FOREIGN PATENT DOCUMENTS

| CN | 103630269 A | 3/2014 |
| EP | 1992928 A2 | 11/2008 |

(Continued)

OTHER PUBLICATIONS

Extended European Search Report for EP Application No. 18175038.1, dated Oct. 25, 2018, 7 Pages.

(Continued)

*Primary Examiner* — Mirellys Jagan
(74) *Attorney, Agent, or Firm* — Kinney & Lange, P.A.

(57) ABSTRACT

A total air temperature probe includes a housing including an inlet scoop, an outlet, a main airflow passage extending from the inlet scoop to the outlet, an exit that extends through the housing, and a total air temperature sensor flow passage and a sensor assembly positioned in the total air temperature sensor flow passage. The main airflow passage includes an upper inlet surface extending from the inlet scoop, a lower inlet surface opposite the upper inlet surface and extending from the inlet scoop, an upper outlet surface extending from the upper inlet surface to the outlet, and a lower outlet surface opposite the upper outlet surface and extending from a split point in the housing to the outlet. The total air temperature sensor flow passage branches off from the main airflow passage and extends to the exit. The upper outlet surface is consistently concave toward the outlet.

20 Claims, 3 Drawing Sheets

(56) References Cited

U.S. PATENT DOCUMENTS

| | | |
|---|---|---|
| 6,974,250 B2 | 12/2005 | Severson |
| 7,124,630 B2 | 10/2006 | Hanson et al. |
| 7,150,560 B2 | 12/2006 | Hanson et al. |
| 7,191,643 B2 | 3/2007 | Rasmussen et al. |
| 7,357,572 B2 | 4/2008 | Benning et al. |
| 7,441,948 B2 | 10/2008 | Bernard et al. |
| 7,828,477 B2 | 11/2010 | Benning et al. |
| 7,854,548 B2 | 12/2010 | Sandnas et al. |
| 8,104,955 B2 | 1/2012 | Benning et al. |
| 8,157,440 B2 | 4/2012 | Kulczyk |
| 8,864,370 B2 | 10/2014 | Dijon et al. |
| 2003/0058919 A1 | 3/2003 | Ice et al. |
| 2004/0237641 A1 | 12/2004 | Hanson et al. |
| 2005/0232332 A1 | 10/2005 | Hanson et al. |
| 2006/0056489 A1 | 3/2006 | Bernard et al. |
| 2008/0151963 A1* | 6/2008 | Sandnas ............... G01K 13/028 374/109 |
| 2008/0285620 A1* | 11/2008 | Benning ............... G01K 13/028 374/138 |
| 2009/0154522 A1* | 6/2009 | Kulczyk ............... G01K 13/028 374/138 |
| 2014/0050247 A1* | 2/2014 | Herman ............... G01K 13/028 374/138 |
| 2014/0169401 A1 | 6/2014 | Schwie et al. |
| 2016/0102562 A1 | 4/2016 | Evans et al. |
| 2016/0238456 A1 | 8/2016 | Wigen |
| 2017/0227402 A1 | 8/2017 | Isebrand |
| 2017/0227404 A1 | 8/2017 | Herman et al. |
| 2018/0356293 A1* | 12/2018 | Isebrand ............... G01K 13/028 |
| 2019/0094083 A1* | 3/2019 | Gilb ............... G01K 13/028 |

FOREIGN PATENT DOCUMENTS

| | | |
|---|---|---|
| EP | 2072981 A2 | 6/2009 |
| EP | 2700925 A2 | 2/2014 |
| EP | 2930492 A2 | 10/2015 |
| EP | 3205582 A1 | 8/2017 |
| EP | 3413025 A1 | 12/2018 |
| EP | 3462154 A1 | 4/2019 |
| WO | WO03027622 A1 | 4/2003 |
| WO | WO03050496 A2 | 6/2003 |

OTHER PUBLICATIONS

Extended European Search Report for EP Application No. 17155028.8, dated Jul. 17, 2017, 9 Pages.
Extended European Search Report for European Patent Application No. 19180681.9, dated Oct. 24, 2019, 19 pages.
First Chinese Office Action for Chinese Patent Application No. 201710071358.7, dated Jun. 18, 2019, 6 pages.
Brazilian Official Action for Brazilian Patent Application No. BR 10 2016 029192 5, dated Jun. 2, 2020, 6 pages.

* cited by examiner

TOTAL AIR TEMPERATURE PROBE WITH CONCAVE FLOW PATH TRANSITIONS TO OUTLET

CROSS-REFERENCE TO RELATED APPLICATION(S)

Reference is made to U.S. application Ser. No. 15/617,768 filed Jun. 8, 2017 entitled "TOTAL AIR TEMPERATURE PROBE WITH REDUCED ICING SENSOR FLOW PASSAGE GEOMETRY."

BACKGROUND

The present disclosure relates to sensors, and in particular, to total air temperature (TAT) probes.

TAT probes are mounted on aircraft to measure the total air temperature on the skin of the aircraft. More specifically, TAT probes cause the surrounding airflow to stagnate and then measure the temperature of the stagnated air. Often TAT probes operate in environmental conditions that may include rain, ice, ice crystals, and other particles. Large particles can break into smaller particles within the main airflow passage of the TAT probe. Such particles can flow into the TAT probe and accumulate on the sensor assembly of the TAT probe, which may result in erroneous TAT measurement.

SUMMARY

A total air temperature probe includes a housing including an inlet scoop, an outlet, a main airflow passage extending from the inlet scoop to the outlet, an exit that extends through the housing, and a total air temperature sensor flow passage and a sensor assembly positioned in the total air temperature sensor flow passage. The main airflow passage includes an upper inlet surface extending from the inlet scoop, a lower inlet surface opposite the upper inlet surface and extending from the inlet scoop, an upper outlet surface extending from the upper inlet surface to the outlet, and a lower outlet surface opposite the upper outlet surface and extending from a split point in the housing to the outlet. The total air temperature sensor flow passage branches off from the main airflow passage at a location between the lower inlet surface and the lower outlet surface and extends to the exit. The upper outlet surface is consistently concave toward the outlet.

A total air temperature probe includes a housing including an inlet scoop; an outlet; a main airflow passage extending from the inlet scoop to the outlet; an exit that extends through the housing; a total air temperature sensor flow passage that branches off from the main airflow passage and extends to the exit; and a sensor assembly positioned in the total air temperature sensor flow passage. The main airflow passage includes a first side surface extending from the inlet scoop to the outlet and a second side surface opposite the first side surface and extending from the inlet scoop to the outlet. The first side surface includes a first planar portion extending from the inlet scoop and a first concave portion extending from the first planar portion to the outlet. The second side surface includes a second planar portion extending from the inlet scoop and a second concave portion extending from the second planar portion to the outlet.

DETAILED DESCRIPTION

In general, the present disclosure is a total air temperature (TAT) probe that has a main airflow passage that includes a consistently concave upper outlet surface and side surfaces with consistently concave portions. As such, the main airflow passage has a decreased angle of impact with the airflow moving through the main airflow passage, resulting in less fracturing of large ice particles, which allows the particles to move through the main airflow passage to the outlet rather than travel down the TAT sensor flow passage as smaller particles where they can accrete on the sensor assembly and cause erroneous measurement.

Figure 1:
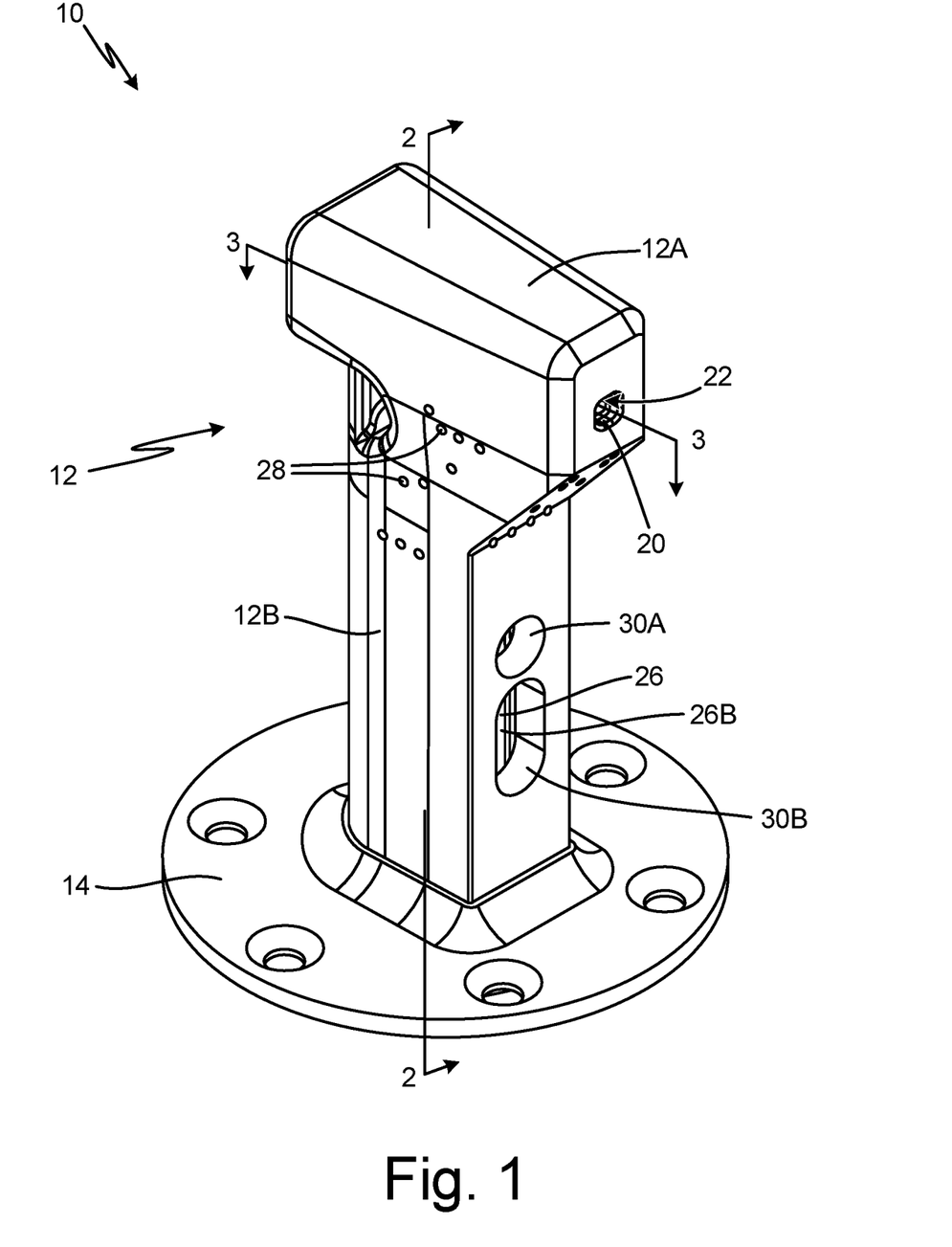
FIG. 1 is a perspective view of a total air temperature (TAT) probe.
Figure 2:
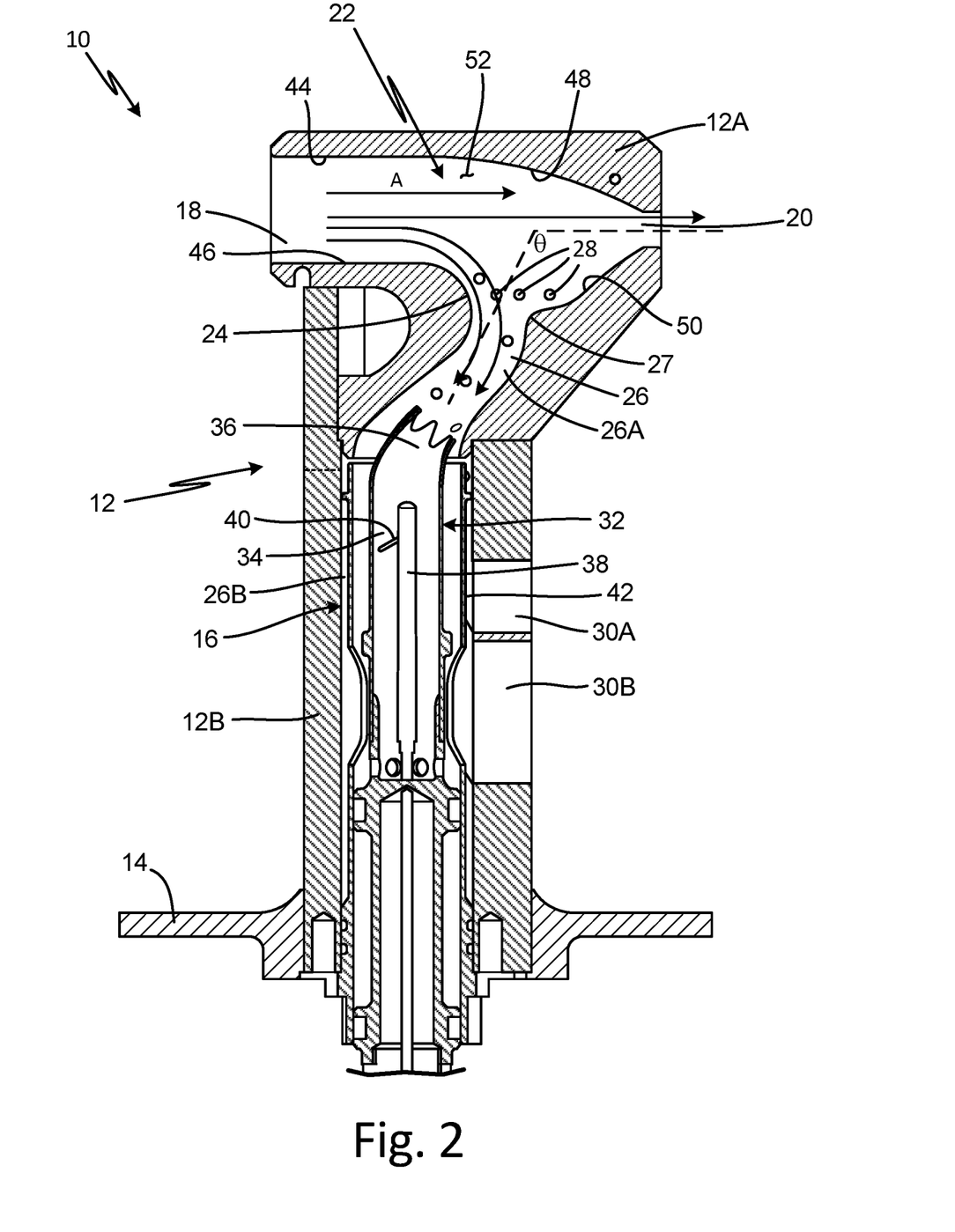
FIG. 2 is a cross-sectional view of the TAT probe taken along line 2-2 of FIG. 1.
Figure 3:
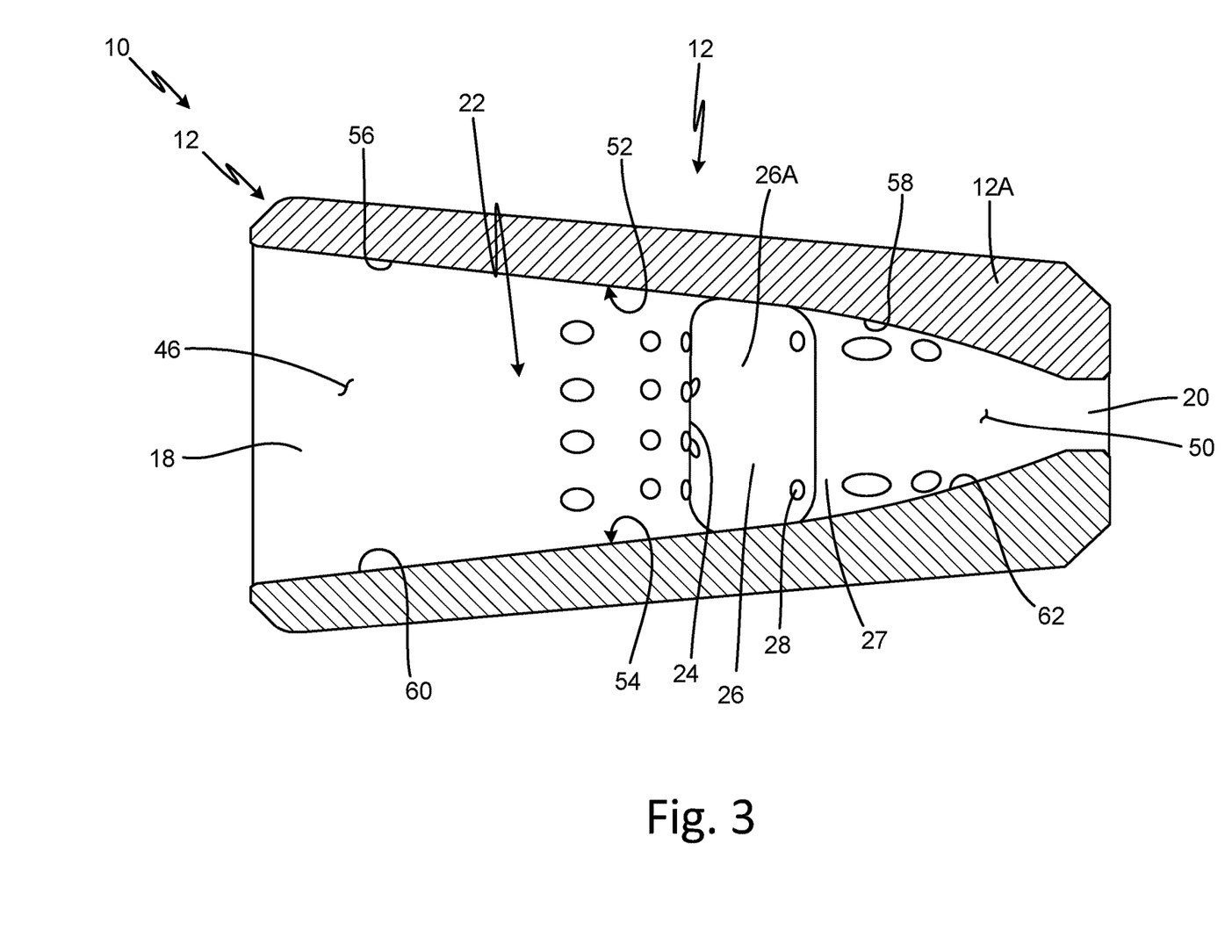
FIG. 3 is a cross-sectional view of the TAT probe taken along line 3-3 of FIG. 1.

FIG. 1 is a perspective view of TAT probe 10. FIG. 2 is a cross-sectional view of TAT probe 10 taken along line 2-2 of FIG. 1. FIG. 3 is a cross-sectional view of TAT probe 10 taken along line 3-3 of FIG. 1. FIGS. 1, 2 and 3 will be discussed together. TAT probe 10 includes housing 12 (which has head 12A and strut 12B), mounting flange 14, and sensor assembly 16. Housing 12 includes inlet scoop 18, outlet 20, main airflow passage 22, inertial separation bend 24, TAT sensor flow passage 26 (which includes first portion 26A and second portion 26B), split point 27, bleed holes 28, and exit ports 30A and 30B. Sensor assembly 16 includes element flow tube 32 (including main body 34 and entrance 36), sensing elements 38, tip support 40, and flow liner 42. Main airflow passage 22 includes upper inlet surface 44, lower inlet surface 46, upper outlet surface 48, lower outlet surface 50, first side surface 52, and second side surface 54 (shown in FIG. 3). First side surface 52 includes first planar portion 56 (shown in FIG. 3) and first concave portion 58 (shown in FIG. 3). Second side surface 54 includes second planar portion 60 (shown in FIG. 3) and second concave portion 62 (shown in FIG. 3).

TAT probe 10 has housing 12 attached to mounting flange 14. Housing 12 is heated and provides structure for TAT probe 10. Housing 12 has head 12A at an upper portion of housing. Head 12A is connected to strut 12B of housing 12. Strut 12B is connected to head 12A and mounting flange 14. Mounting flange 14 mounts TAT probe 10 to an aircraft. Sensor assembly 16 is positioned within TAT sensor flow passage 26 of housing 12.

Inlet scoop 18 is an opening located in head 12A near an upper end of housing 12 at a first side of housing 12. Outlet 20 is an opening located in head 12A near an upper end of housing 12 at a second side of housing 12. Outlet 20 has a smaller cross-sectional area than inlet scoop 18. Main airflow passage 22 is a passageway within head 12A of housing 12 that extends from inlet scoop 18 to outlet 20. Inertial separation bend 24 is a curved portion of housing 12. More specifically, inertial separation bend 24 is a curve in head 12A of housing 12 between inlet scoop 18 and outlet 20 and adjacent main airflow passage 22. Inertial separation bend 24 does not extend into main airflow passage 22. In alternate embodiments, inertial separation bend 24 may not be curved. Inertial separation bend 24 forms angle θ of about 145 degrees between main airflow passage 24 and first portion 26A of TAT sensor flow passage 26. Inertial separation bend 24 defines first portion 26A of TAT sensor flow passage 26. TAT sensor flow passage 26 is a passageway within housing 12 that branches off from main airflow passage 22 between inlet scoop 18 and outlet 20, such that first portion 26A of TAT sensor flow passage 26 is downstream of inlet scoop 18. First portion 26A of TAT sensor flow passage is located in head 12A. First portion 26A of TAT sensor flow passage 26 is curved along inertial separation bend 24 and is angled with respect to main airflow passage 22. In alternate embodiments, the first portion of TAT sensor flow passage 26 may be straight. As stated above, first portion 26A of TAT sensor flow passage 26 may have an angle θ of about 145 degrees with respect to main airflow passage 22. Second portion 26B of TAT sensor flow passage 26 is connected to first portion 26A of TAT sensor flow passage 26 and transitions back to 90 degrees, or is perpendicular, with respect to main airflow passage 22. Second portion 26B of TAT sensor flow passage 26 is located in strut 12B and extends into housing 12 toward mounting flange 14. Sensor assembly 16 is positioned in second portion 26B of TAT sensor flow passage 26, with a portion of sensor assembly 16 extending into first portion 26A. TAT sensor flow passage 26 is in fluid communication with main airflow passage 22.

Split point 27 is a protrusion or elbow in head 12A of housing 12 opposite inertial separation bend 24 that also defines first portion 26A of TAT sensor flow passage 26. Split point 27 protrudes into first portion 26A of TAT sensor flow passage 26 across from about the midpoint of inertial separation bend 24. Bleed holes 28 are passageways in housing 12 that extend from main airflow passage 22 or TAT sensor flow passage 26 through housing 12 to an exterior of housing 12. Exit ports 30A and 30B form an exit that extends through housing 12. Exit ports 30A and 30B are passageways in strut 12B of housing 12 that extend from an end of second portion 26B of TAT sensor flow passage 26 through housing 12 to the exterior of housing 12. As such, second portion 26B of TAT sensor flow passage 26 extends from first portion 26A of TAT sensor flow passage 26 to exit ports 30A and 30B. The passageways of exit ports 30A and 30B reach the exterior of housing 12 at the second side of housing 12. Exit port 30A is an upper exit port, and exit port 30B is a lower exit port positioned below upper exit port 30A.

Sensor assembly 16 has annular element flow tube 32 positioned within TAT sensor flow passage 26. Element flow tube 32 has main body 34 with entrance 36 having a lower end connected to an upper end of main body 34. Main body 34 is positioned in second portion 26B of TAT sensor flow passage 26. Entrance 36 extends upstream from the upper end of main body 34 into first portion 26A of TAT sensor flow passage 26. In this embodiment, entrance 36 follows the curve of first portion 26A of TAT sensor flow passage 26. Entrance 36 has protrusions forming a series of alternating peaks and valleys along an upper end of entrance 36 that extend upstream into first portion 26A of TAT sensor flow passage 26 toward airflow A.

Element flow tube 32 is positioned around sensing elements 38. More specifically, main body 34 is positioned around sensing elements 38 within second portion 26B of TAT sensor flow passage 26. Sensing elements 38 are rod-like and located within element flow tube 32. Sensing elements 38 may be wire wound platinum resistance devices. Sensor assembly 16 has two sensing elements 38. In alternate embodiments, sensor assembly 16 has any number of sensing elements 38. Tip support 40 is connected to an inner surface of element flow tube 32 and extends toward and contacts sides of sensing elements 38 at about a 45 degree angle. Flow liner 42 is annular and positioned around element flow tube 32 in second portion 26B of TAT sensor flow passage 26. As such, sensing elements 38, element flow tube 32, and flow liner 42 make up a concentric tubular assembly in TAT sensor flow passage 26. Sensor assembly 16 may be formed by additive manufacturing.

Outlet 20 is annular and makes up an end of main airflow passage 22. Main airflow passage 22 has upper inlet surface 44 connected to and extending from inlet scoop 18, and lower inlet surface 46 opposite upper inlet surface 44 and connected to and extending from inlet scoop 18. Upper inlet surface 44 is also connected to upper outlet surface 48. Lower inlet surface 46 extends from inlet scoop 18 to inertial separation bend 24. FIG. 2 shows the geometry of upper inlet surface 44, lower inlet surface 46, and upper outlet surface 48. Lower inlet surface 46 of main airflow passage 22 is substantially planar, or flat. Inertial separation bend 24 beings to curve at the point where inertial separation bend 24 connects to lower inlet surface 46. Inertial separation bend 24 curves away from main airflow passage 22 immediately. Upper inlet surface 44 and lower inlet surface 46 are horizontal and substantially parallel to each other. Upper inlet surface 44 and lower inlet surface 46 are also substantially parallel with oncoming airflow A when TAT probe 10 is installed on an aircraft. Upper outlet surface 48 extends from upper inlet surface 44 to outlet 20 such that upper outlet surface 48 is between upper inlet surface 44 and outlet 20. Upper inlet surface 44 connects, or transitions, to upper outlet surface 48 about midway through main airflow passage 22. Upper outlet surface 48 is consistently concave toward outlet 20. Upper outlet surface 48 has a constant curvature. Lower outlet surface 50 is opposite upper outlet surface 48 and extends from split point 27 to outlet 20 such that lower outlet surface 50 is between split point 27 and outlet 20. TAT sensor flow passage 26 branches off from main airflow passage 22 at a location between lower inlet surface 46 and lower outlet surface 50.

FIG. 3 shows the geometry of first side surface 52 and second side surface 54. First side surface 52 extends from inlet scoop 18 to outlet 20 such that first side surface 52 is between inlet scoop 18 and outlet 20. Second side surface 54 is opposite first side surface 52 and extends from inlet scoop 18 to outlet 20 such that second side surface 54 is between inlet scoop 18 and outlet 20. First side surface 52 and second side surface 54 are symmetrical.

First side surface 52 has first planar portion 56 extending from inlet scoop 18 and first concave portion 58 extending from first planar portion 56 to outlet 20. First planar portion 56 is connected to, or transitions to, first concave portion 58 about two thirds through main airflow passage 22 from inlet scoop 18. First planar portion 56 has an angle of between about five degrees and about eight degrees to a center line of main airflow passage 22. First concave portion 58 is consistently concave toward outlet 20. First concave portion 58 has a constant curvature. Second side surface 54 has second planar portion 60 extending from inlet scoop 18 and second concave portion 62 extending from second planar portion 60 to outlet 20. Second planar portion 60 is connected to, or transitions to, second concave portion 62 about two thirds through main airflow passage 22 from inlet scoop 18. Second planar portion 60 has an angle of between about five degrees and about eight degrees to a center line of main airflow passage 22. Second concave portion 62 is consistently concave toward outlet 20. Second concave portion 62 has a constant curvature.

Airflow A, which contains rain and ice particles, enters head 12A of housing 12 of TAT probe 10 through inlet scoop 18. A portion of airflow A, along with a portion of the particles, flows through main airflow passage 22 and out of head 12A of housing 12 through outlet 20. Another portion of airflow A, along with smaller particles, flows partially through main airflow passage 22 and turns into TAT sensor flow passage 26 at inertial separation bend 24 and split point 27. Outlet 20 is smaller than inlet scoop 18 so that a desired amount of air may be forced around inertial separation bend 24 into TAT sensor flow passage 26. Split point 27 across from about the midpoint of inertial separation bend 24 prevents airflow A from becoming excessively turbulent adjacent TAT sensor flow passage 26. Airflow A curves along inertial separation bend 24 as airflow A flows into and through first portion 26A of TAT sensor flow passage 26. Some of airflow A in main airflow passage 22 and some of airflow A in first portion 26A of TAT sensor flow passage 26 flows out of housing 12 through bleed holes 28. Airflow A remaining in TAT sensor flow passage 26 flows around and into sensor assembly 16. The small particles that flow into TAT sensor flow passage 26 may accumulate as slender rod-like ice growths, which shed before substantially disrupting airflow, on protrusions of entrance 36. Airflow A flows through entrance 36 to reach sensing elements 38. Sensing elements 38 measure the total air temperature of airflow A that enters element flow tube 32, so that the measured total air temperature can be communicated to a flight computer. Airflow A exits second portion 26B of TAT sensor flow passage 26 and strut 12B of housing 12 through exit ports 30A and 30B.

Inertial separation bend 24 separates airflow A. Large particles in airflow A moving through main airflow passage 22 cannot move along inertial separation bend 24. Rather, the large particles in airflow A continue past inertial separation bend 24 and flow through outlet 20 to exit TAT probe 10. Because upper inlet surface 44 and lower inlet surface 46 are parallel and lower inlet surface 46 is substantially flat, particles in airflow A efficiently pass through main airflow passage 22 with minimal deflection off of or fracturing on such surfaces. Likewise, because upper outlet surface 48, first concave portion 58, and second concave portion 62 are consistently concave right up to outlet 20, particles in airflow A efficiently pass through main airflow passage 22 and out of outlet 20 with minimal deflection off of or fracturing on such surfaces. Particles in airflow A are directed toward outlet 20 and avoid collisions with surfaces of main airflow channel 22. Further, particles in airflow A that do collide with surfaces of main airflow channel 22, such as upper outlet surface 48, are deflected toward outlet 20 due to the consistently concave geometry of the surfaces.

TAT probes 10 operate in environmental conditions that may include rain, ice, and ice crystals. Extreme icing conditions may cause an abundance of water and ice particles to move through TAT probe 10. As a result, internal ice accretion can occur on the sensor assembly of the TAT probe, which can result in temperature measurement errors.

Traditional TAT probes have upper inlet surfaces and lower inlet surfaces that are not parallel to each other or parallel to the airflow. Rather, such TAT probes have a ramping geometry, an air bump that extends into the main airflow passage, or other various geometries. Additionally, traditional TAT probes have upper outlet surfaces that are not consistently concave, but instead include portions that are planar, convex, or otherwise not consistently concave. Further, rather than having only a planar portion and a concave portion, side surfaces of traditional TAT probes have convex portions, bumps protruding into the main airflow passage that create side surfaces with hourglass shapes, or other various geometries. Consequently, larger particles within the airflow in the main airflow passage are more likely to impact upper inlet surfaces, lower inlet surfaces, upper outlet surfaces, and side surfaces of traditional TAT probes. The particles may deflect off the surfaces into the TAT sensor flow passage. Large particles unable to move along the inertial separation bend and into the TAT sensor flow passage may also fracture into smaller-sized particles upon impact with such surfaces and become capable of moving past inertial separation bend 24 into the TAT sensor flow passage. Surfaces of the main airflow passage are also heated, causing impacting particles to become wetted. For example, a large ice particle may impact a convex portion of the main airflow passage and fracture into small wetted particles that can move down the TAT sensor flow passage. Particles in TAT sensor flow passage can become problematic. Particles that move into TAT sensor flow passage can accrete on the sensor assembly and interfere with temperature measurement.

Because there is less surface area in main airflow passage 22 for deflection and fracturing of ice particles, or, more specifically, less surface for oblique impact by particles in airflow A, less deflection and fracturing of particles occurs. Large particles in airflow A moving through main airflow passage 22 are less likely to impact upper outlet surface 48, first side surface 52, and second side surface 54, and thus are less likely to fracture into smaller ice particles. Consequently, less particles are able to flow down TAT sensor flow passage 26 and accrete onto sensor assembly 16. Rather, larger ice particles and liquid droplets in airflow A have minimal interaction with surfaces of main airflow passage 22 and more efficiently and easily pass through main airflow passage 22 and out of TAT probe 10 through outlet 20. Because ice particles can more smoothly and gently reach outlet 20, more particles exit TAT probe 10 and less particles reach and accumulate on sensor assembly 16, which can cause erroneous TAT measurement. Thus, TAT probe 10 can operate properly during fairly severe icing conditions.

Additionally, while first portion 26A of TAT sensor flow passage 26 is curved to prevent large particles from moving into TAT sensor flow passage 26, second portion 26B is straight and perpendicular to main airflow passage 22, making TAT probe 10 simpler to manufacture than if second portion 26B of TAT sensor flow passage 26 was angled or curved.

The terms "upper" and "lower" in upper inlet surface 44, lower inlet surface 46, upper outlet surface 48, and lower outlet surface 50 have not been used in the present disclosure to describe orientations relative to gravity, but rather orientations when TAT probe 10 is in an upright position. Thus, the term "upper" has been used to describe surfaces farther from strut 12B, and the term "lower" has been used to describe surfaces closer to strut 12B.

Discussion of Possible Embodiments

The following are non-exclusive descriptions of possible embodiments of the present invention.

A total air temperature probe includes a housing including: an inlet scoop; an outlet; a main airflow passage extending from the inlet scoop to the outlet, the main airflow passage including: an upper inlet surface extending from the inlet scoop; a lower inlet surface opposite the upper inlet surface and extending from the inlet scoop; an upper outlet surface extending from the upper inlet surface to the outlet; and a lower outlet surface opposite the upper outlet surface and extending from a split point in the housing to the outlet; wherein the upper outlet surface is consistently concave toward the outlet; an exit that extends through the housing; and a total air temperature sensor flow passage that branches off from the main airflow passage at a location between the lower inlet surface and the lower outlet surface and that extends to the exit; and a sensor assembly positioned in the total air temperature sensor flow passage.

The total air temperature probe of the preceding paragraph can optionally include, additionally and/or alternatively, any one or more of the following features, configurations and/or additional components:

The main airflow passage further includes: a first side surface extending from the inlet scoop to the outlet, the first side surface including: a first planar portion extending from the inlet scoop; and a first concave portion extending from the first planar portion to the outlet; and a second side surface opposite the first side surface and extending from the inlet scoop to the outlet, the second side surface including: a second planar portion extending from the inlet scoop; and a second concave portion extending from the second planar portion to the outlet.

The first concave portion and the second concave portion are consistently concave toward the outlet.

The upper inlet surface and the lower inlet surface are substantially parallel.

The upper inlet surface and the lower inlet surface are configured to be substantially parallel with oncoming airflow.

The exit comprises an upper exit port and a lower exit port.

The housing further includes an inertial separation bend connected to the lower inlet surface and defining a first portion of the total air temperature sensor flow passage.

The lower inlet surface extends from the inlet scoop to the inertial separation bend and is substantially planar.

The split point is opposite the inertial separation bend.

The upper inlet surface connects to the upper outlet surface about midway through the main airflow passage.

The housing has a head and a strut connected to the head, the main airflow passage being within the head of the housing.

The total air temperature sensor flow passage includes a first portion located in the head and a second portion located in the strut.

The first portion of the total air temperature sensor flow passage is curved.

A total air temperature probe includes a housing including: an inlet scoop; an outlet; a main airflow passage extending from the inlet scoop to the outlet, the main airflow passage including: a first side surface extending from the inlet scoop to the outlet, the first side surface including: a first planar portion extending from the inlet scoop; and a first concave portion extending from the first planar portion to the outlet; and a second side surface opposite the first side surface and extending from the inlet scoop to the outlet, the second side surface including: a second planar portion extending from the inlet scoop; and a second concave portion extending from the second planar portion to the outlet; an exit that extends through the housing; and a total air temperature sensor flow passage that branches off from the main airflow passage and extends to the exit; and a sensor assembly positioned in the total air temperature sensor flow passage.

The total air temperature probe of the preceding paragraph can optionally include, additionally and/or alternatively, any one or more of the following features, configurations and/or additional components:

The main airflow passage further includes: an upper inlet surface extending from the inlet scoop; a lower inlet surface opposite the upper inlet surface and extending from the inlet scoop; an upper outlet surface extending from the upper inlet surface to the outlet; and a lower outlet surface opposite the upper outlet surface and extending from a split point in the housing to the outlet; wherein the upper outlet surface is consistently concave toward the outlet, and the total air temperature sensor flow passage branches off from the main airflow passage at a location between the lower inlet surface and the lower outlet surface.

The upper inlet surface and the lower inlet surface are substantially parallel.

The housing further includes an inertial separation bend connected to the lower inlet surface and defining a first portion of the total air temperature sensor flow passage.

The lower inlet surface extends from the inlet scoop to the inertial separation bend and is substantially planar.

The upper inlet surface and the lower inlet surface are configured to be substantially parallel with oncoming airflow.

The split point is opposite the inertial separation bend.

The first concave portion and the second concave portion are consistently concave toward the outlet.

The exit comprises an upper exit port and a lower exit port.

The first planar portion connects to the first concave portion about two thirds through the main airflow passage from the inlet scoop, and the second planar portion connects to the second concave portion about two thirds through the main airflow passage from the inlet scoop.

The housing has a head and a strut connected to the head, the main airflow passage being within the head of the housing.

The total air temperature sensor flow passage includes a first portion located in the head and a second portion located in the strut.

The first portion of the total air temperature sensor flow passage is curved.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A total air temperature probe comprising:
   a housing including:
      an inlet scoop;
      an outlet;
      a main airflow passage extending from the inlet scoop to the outlet, the main airflow passage including:
         an upper inlet surface extending from the inlet scoop;
         a lower inlet surface opposite the upper inlet surface and extending from the inlet scoop;
         an upper outlet surface extending from the upper inlet surface to the outlet; and
         a lower outlet surface opposite the upper outlet surface and extending from a split point in the housing to the outlet;
         wherein the upper outlet surface is consistently concave toward the outlet and has a constant curvature;
      an exit that extends through the housing; and a total air temperature sensor flow passage that branches off from the main airflow passage at a location between the lower inlet surface and the lower outlet surface and that extends to the exit; and a sensor assembly positioned in the total air temperature sensor flow passage.

2. The total air temperature probe of claim 1, wherein the upper inlet surface and the lower inlet surface are configured to be substantially parallel with oncoming airflow.

3. The total air temperature probe claim 1, wherein the upper inlet surface connects to the upper outlet surface about midway through the main airflow passage.

4. The total air temperature probe of claim 1, wherein the housing has a head and a strut connected to the head, the main airflow passage being within the head of the housing.

5. The total air temperature probe of claim 1, wherein the housing further includes an inertial separation bend connected to the lower inlet surface and defining a first portion of the total air temperature sensor flow passage.

6. The total air temperature probe of claim 5, wherein the lower inlet surface extends from the inlet scoop to the inertial separation bend and is substantially planar.

7. The total air temperature probe of claim 5, wherein the split point is opposite the inertial separation bend.

8. A total air temperature probe comprising:
a housing including:
  an inlet scoop;
  an outlet;
  a main airflow passage extending from the inlet scoop to the outlet, the main airflow passage including:
    an upper inlet surface extending from the inlet scoop;
    a lower inlet surface opposite the upper inlet surface and extending from the inlet scoop;
    an upper outlet surface extending from the upper inlet surface to the outlet; and
    a lower outlet surface opposite the upper outlet surface and extending from a split point in the housing to the outlet;
  a first side surface extending from the inlet scoop to the outlet, the first side surface including:
    a first planar portion extending from the inlet scoop; and
    a first concave portion extending from the first planar portion to the outlet; and
  a second side surface opposite the first side surface and extending from the inlet scoop to the outlet, the second side surface including:
    a second planar portion extending from the inlet scoop; and
    a second concave portion extending from the second planar portion to the outlet;
  wherein the upper outlet surface is consistently concave toward the outlet;
  an exit that extends through the housing; and
  a total air temperature sensor flow passage that branches off from the main airflow passage at a location between the lower inlet surface and the lower outlet surface and that extends to the exit; and
a sensor assembly positioned in the total air temperature sensor flow passage.

9. The total air temperature probe of claim 8, wherein the first concave portion and the second concave portion are consistently concave toward the outlet.

10. A total air temperature robe comprising:
a housing including:
  an inlet scoop;
  an outlet;
  a main airflow passage extending from the inlet scoop to the outlet, the main airflow passage including:
    an upper inlet surface extending from the inlet scoop;
    a lower inlet surface opposite the upper inlet surface and extending from the inlet scoop;
    an upper outlet surface extending from the upper inlet surface to the outlet; and
    a lower outlet surface opposite the upper outlet surface and extending from a split point in the housing to the outlet;
    wherein the upper inlet surface and the lower inlet surface are substantially parallel; and
    wherein the upper outlet surface is consistently concave toward the outlet;
  an exit that extends through the housing; and
  a total air temperature sensor flow passage that branches off from the main airflow passage at a location between the lower inlet surface and the lower outlet surface and that extends to the exit; and
a sensor assembly positioned in the total air temperature sensor flow passage.

11. A total air temperature probe comprising:
a housing including:
  an inlet scoop;
  an outlet;
  a main airflow passage extending from the inlet scoop to the outlet, the main airflow passage including:
    an upper inlet surface extending from the inlet scoop;
    a lower inlet surface opposite the upper inlet surface and extending from the inlet scoop;
    an upper outlet surface extending from the upper inlet surface to the outlet; and
    a lower outlet surface opposite the upper outlet surface and extending from a split point in the housing to the outlet;
    wherein the upper outlet surface is consistently concave toward the outlet;
  an exit that extends through the housing, wherein the exit comprises an upper exit port and a lower exit port; and
  a total air temperature sensor flow passage that branches off from the main airflow passage at a location between the lower inlet surface and the lower outlet surface and that extends to the exit; and
a sensor assembly positioned in the total air temperature sensor flow passage.

12. A total air temperature probe comprising:
a housing including:
  an inlet scoop;
  an outlet;
  a main airflow passage extending from the inlet scoop to the outlet, the main airflow passage including:
    an upper inlet surface extending from the inlet scoop;
    a lower inlet surface opposite the upper inlet surface and extending from the inlet scoop;
    an upper outlet surface extending from the upper inlet surface to the outlet; and
    a lower outlet surface opposite the upper outlet surface and extending from a split point in the housing to the outlet;
    wherein the upper outlet surface is consistently concave toward the outlet; and
    wherein the housing has a head and a strut connected to the head, the main airflow passage being within the head of the housing;
  an exit that extends through the housing; and a total air temperature sensor flow passage that branches off from the main airflow passage at a location between the lower inlet surface and the lower outlet surface and that extends to the exit, wherein the total air temperature sensor flow passage includes a first portion located in the head and a second portion located in the strut; and a sensor assembly positioned in the total air temperature sensor flow passage.

13. A total air temperature probe comprising:

a housing including:

an inlet scoop;

an outlet;

a main airflow passage extending from the inlet scoop to the outlet, the main airflow passage including:

a first side surface extending from the inlet scoop to the outlet, the first side surface including:

a first planar portion extending from the inlet scoop; and a first concave portion extending from the first planar portion to the outlet; and a second side surface opposite the first side surface and extending from the inlet scoop to the outlet, the second side surface including:

a second planar portion extending from the inlet scoop; and a second concave portion extending from the second planar portion to the outlet;

an exit that extends through the housing; and a total air temperature sensor flow passage that branches off from the main airflow passage and extends to the exit; and a sensor assembly positioned in the total air temperature sensor flow passage.

14. The total air temperature probe of claim 13, wherein the first concave portion and the second concave portion are consistently concave toward the outlet.

15. The total air temperature probe of claim 13, wherein the first planar portion connects to the first concave portion about two thirds through the main airflow passage from the inlet scoop, and the second planar portion connects to the second concave portion about two thirds through the main airflow passage from the inlet scoop.

16. The total air temperature probe of claim 13, wherein the housing has a head and a strut connected to the head, the main airflow passage being within the head of the housing.

17. The total air temperature probe of claim 16, wherein the total air temperature sensor flow passage includes a first portion located in the head and a second portion located in the strut.

18. The total air temperature probe of claim 13, wherein the main airflow passage further includes:

an upper inlet surface extending from the inlet scoop;

a lower inlet surface opposite the upper inlet surface and extending from the inlet scoop;

an upper outlet surface extending from the upper inlet surface to the outlet; and a lower outlet surface opposite the upper outlet surface and extending from a split point in the housing to the outlet;

wherein the upper inlet surface and the lower inlet surface are substantially parallel and are configured to be substantially parallel with oncoming airflow; and wherein the upper outlet surface is consistently concave toward the outlet, and the total air temperature sensor flow passage branches off from the main airflow passage at a location between the lower inlet surface and the lower outlet surface.

19. The total air temperature probe of claim 18, wherein the housing further includes an inertial separation bend connected to the lower inlet surface and defining a first portion of the total air temperature sensor flow passage; and wherein the lower inlet surface extends from the inlet scoop to the inertial separation bend and is substantially planar.

20. The total air temperature probe of claim 19, wherein the split point is opposite the inertial separation bend.

* * * * *

UNITED STATES PATENT AND TRADEMARK OFFICE
CERTIFICATE OF CORRECTION

PATENT NO. : 10,852,203 B2
APPLICATION NO. : 16/010011
DATED : December 1, 2020
INVENTOR(S) : Scott D. Isebrand Page 1 of 1

It is certified that error appears in the above-identified patent and that said Letters Patent is hereby corrected as shown below:

In the Claims

Column 9, Line 64:
Delete "robe"
Insert --probe--

Signed and Sealed this
Fifth Day of January, 2021

Andrei Iancu
*Director of the United States Patent and Trademark Office*